United States Patent [19]

Nakano

[11] 4,426,844
[45] Jan. 24, 1984

[54] ENGINE MUFFLER OF HEAT-EXCHANGING TYPE

[75] Inventor: Keiichi Nakano, Sakaishi, Japan

[73] Assignee: Kubota Ltd., Osaka, Japan

[21] Appl. No.: 359,844

[22] Filed: Mar. 19, 1982

[30] Foreign Application Priority Data

Mar. 26, 1981 [JP] Japan .............................. 56-43558[U]

[51] Int. Cl.³ .............................................. F01N 3/28
[52] U.S. Cl. ........................................ 60/295; 60/299; 60/320; 165/73; 422/173
[58] Field of Search .................. 60/295, 299, 320, 321; 165/73; 181/283; 422/173

[56] References Cited

U.S. PATENT DOCUMENTS

| 3,041,149 | 6/1962 | Houdry | 60/299 |
| 3,083,083 | 3/1963 | Boysen | 60/299 |
| 3,669,630 | 6/1972 | Filatov | 60/299 |
| 4,218,266 | 8/1980 | Guazzoni | 60/320 |

Primary Examiner—Douglas Hart
Attorney, Agent, or Firm—Schwartz, Jeffery, Schwaab, Mack, Blumenthal & Koch

[57] ABSTRACT

In an engine muffler of heat-exchanging type three basic components of a muffler casing, a catalyst casing and a heat-exchanger casing are individually manufactured as separate structural components and then have their flanges connected overlappingly and fastened together by clamping means, whereby fabrication of the muffler is simplified, it is made more compact and an easy access for maintenance is ensured.

3 Claims, 3 Drawing Figures

ENGINE MUFFLER OF HEAT-EXCHANGING TYPE

BACKGROUND OF THE INVENTION

1. Field of the Invention

The present invention relates generally to an engine muffler of heat-exchanging type. More particularly, it relates to an improved design for such an engine muffler, wherein a catalyst is used for recombustion of unburnt constituents of the engine exhaust gas for purification thereof and also an arrangement is made for efficient recovery of the thermal energy contained in said exhaust gas whose temperature is further raised by said recombustion through absorption thereof by a liquid such as water.

2. Description of the Prior Art

As an example of muffler having heat-exchanging function there has been known one with a catalyst casing surrounded by passages through which a liquid for heat-exchanging is caused to flow directly for recovery of the waste heat. In this known arrangement the recombustion system and the heat-exchanging system are formed in the same part of the muffler interior, this resulting in a complicated multi-wall structure making the muffler inevitably bulky and difficult to fabricate. Another limitation is that the catalyst is less readily accessible for replacement for the same reason.

SUMMARY OF THE INVENTION

It is an object of the present invention to simplify the construction of an engine muffler to facilitate its fabrication. For this end the invention consists in manufacturing a heat-insulated muffler casing into which the engine exhaust is introduced, a catalyst casing and a heat-exchanger casing, the three basic components of the muffler, individually as separate components and then connecting their flanges overlappingly and fastening them together by clamping means.

Another object of the present invention is to reduce the outer diameter of the muffler, and for this end the heat-exchanger casing is disposed outwardly of the end face of the catalyst casing instead of a heat exchanging means being formed around the catalyst casing.

Still another object of the present invention is to facilitate the maintenance procedure such as replacing the catalyst, and for this end it is so arranged that the catalyst casing and the heat-exchanger casing can be readily taken off the heat-insulated muffler casing by simply removivnt said clamping means.

DESCRIPTION OF THE PREFERRED EMBODIMENT

Figure 1:
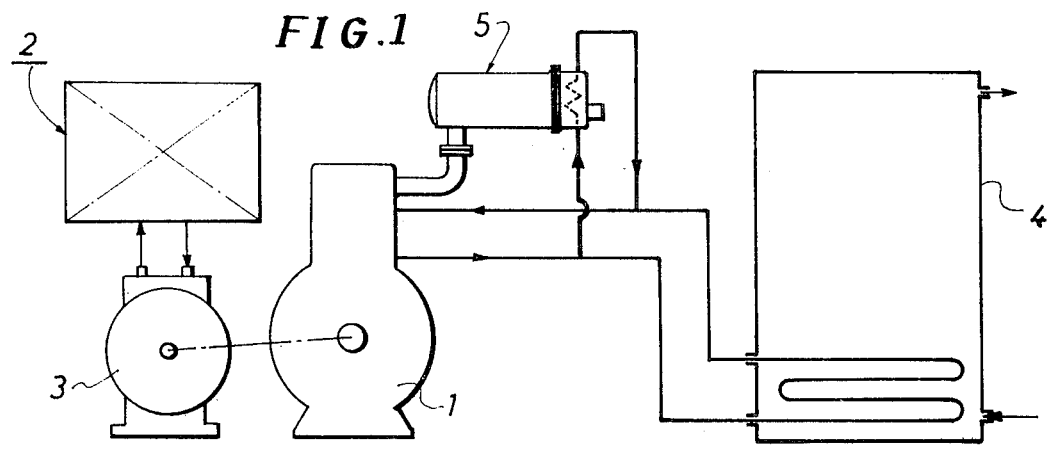
FIG. 1 is a schematic system chart of a heat pump system given to show the working principle a muffler of the present invention.

Referring now to the drawings, described below in detail is an embodiment of the present invention.

FIG. 1 is a schematic system chart of a heat pump system with an engine as power as well as heat source, wherein a 2-cycle engine 1 is used to drive a refrigerant compressor 3 in a room cooling system 2, and the engine cooling water is led to a hot water reservoir 4 for hot water supply for heat exchange. Also it is so arranged that the engine exhaust is subjected to recombustion in the interior of a muffler 5, while part of the engine cooling water is let through the interior of the muffler 5 for recovery of the waste heat.

Figure 2:
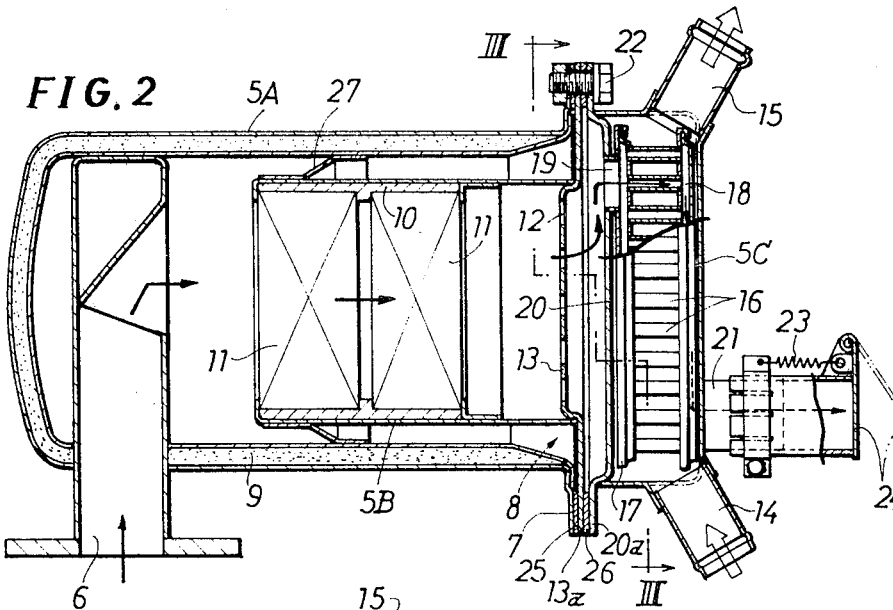
FIG. 2 is a longitudinal sectional view of an embodiment of the present invention.
Figure 3:
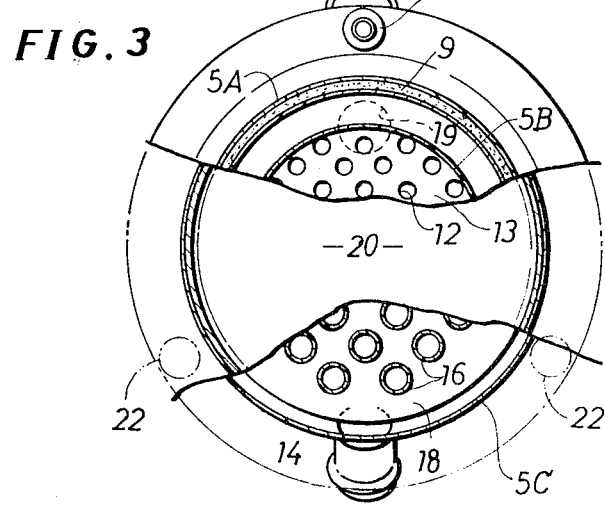
FIG. 3 is a cross-sectional view taken along the line III—III in FIG. 2.

Referring now to FIG. 2 showing the detailed construction of the muffler 5 of heat-exchanging type, this muffler 5 is made up of three basic components, namely a cylindrical muffler casing 5A with one end of it closed into which the engine exhaust is introduced, and a catalyst casing 5B inserted therein and a heat-exchanger casing 5C.

The muffler casing 5A is of a double-wall construction with an exhaust inlet 6 on one side of its bottom and an opening 8 with an outward flange 7. The space contained in the double wall is packed with a heat insulated material 9 so that the casing as a whole is in a heat-insulated construction.

The catalyst casing 5B, too, is formed cylindrically with its wall lined inside with a heat insulating material 10 such as ceramic, and in its interior are packed two separate block-like masses of a catalyst 11. The open end of this casing is closed by a flange plate 13 with a multiple of gas holes 12 in it. On the outside of the casing a profile pipe for spacing 27 is set fixedly.

The heat-exchanger casing 5C is formed as a jacketed housing with an inlet port 14 by which the engine cooling water is introduced to be let out by the outlet port 15. This casing has set therein a pair of head tanks 17 and 18 connected with each other by a multiple of thin tubes 16 for heat exchange. An exhaust inlet opening 19 is provided in a flange plate 20 in communication with the head tank 17 on the exhaust inlet side. The head tank 18 on the exhaust outlet side has an exhaust outlet tube extending therefrom to the outside.

The exhaust outlet tube 21 has provided at its outer end a valve 24 urged to be normally closed by a spring 23 for the exhaust gas flow to be controlled thereby. When the engine 1 is operated no load or at a low load the exhaust back pressure is increased by said valve 24 to thereby lower the fresh fuel-air mixture suction rate of the engine 1 for the explosive force to be generally lowered with the resulting smoothening of combustion.

Flanges 7, 13a and 20a of the muffler casing 5A, the catalyst casing 5B and the heat-exchanger casing 5C manufactured as separate structural components, as mentioned above are connected overlappingly with gaskets 25 and 26 in between and are fastened together by means of a set of clamping bolts 22. Thus, it is possible to assemble the muffler 5 by simply claming together with the bolts 22 the three components 5A, 5B and 5C manufactured and preassembled individually. Also the three components 5A, 5B and 5C can be taken apart by simply removing the bolts 22 for easy access for maintenance such as replacement of the catalyst 11.

In the embodiment described above the heat-exchanger casing 5C is disposed outwardly of the opening 8 of the muffler casing 5A. It is, however, also possible to set the catalyst casing 5B further inward of the muffler casing 5A so as to set the heat-exchanger casing 5C, too, inwardly of said opening 8 and the muffler 5 can thereby be made still more compact.

It is also possible to have the catalyst casing 5B fixedly welded to the flange plate 13 so that the catalyst is replaced together with the casing. Or, alternatively, the casing 5B may be removably connected with the flange plate 13 by screwing, bolting or any other proper means to enable replacement of the catalyst 11 only.

What is claimed is:

1. An engine muffler of heat-exchanging type, wherein an opening 8 is formed in a muffler casing 5A of a heat-insulated construction, a catalyst casing 5B packed with a catalyst 11 is removably inserted into said muffler casing 5A through said opening 8, a heat-exchanger casing 5C for recovery by absorption with a liquid means of the heat contained in the exhaust gas coming out of said catalyst casing 5B is attached to said opening 8 of said muffler casing 5A and these three casings 5A, 5B and 5C are connected together by clamping means 22.

2. A muffler as recited in claim 1, wherein flanges 7, 13a and 20a of said three casings 5A, 5B and 5C are overlappingly connected by clamping together outside and along the open end of said muffler casing 5A.

3. A muffler as recited in claim 1, wherein said heat-exchanger casing 5C is disposed outwardly of said opening 8 of said muffler casing 5A.

* * * * *